United States Patent
Pesavento et al.

(10) Patent No.: US 9,727,565 B2
(45) Date of Patent: Aug. 8, 2017

(54) PHOTO AND VIDEO SEARCH

(71) Applicant: Yahoo! Inc., Sunnyvale, CA (US)

(72) Inventors: Gerry Pesavento, Orinda, CA (US); Huy X. Nguyen, Berkeley, CA (US)

(73) Assignee: Yahoo Holdings, Inc., Sunnyvale, CA (US)

( * ) Notice: Subject to any disclaimer, the term of this patent is extended or adjusted under 35 U.S.C. 154(b) by 0 days.

(21) Appl. No.: 14/290,214

(22) Filed: May 29, 2014

(65) Prior Publication Data

US 2014/0355907 A1 Dec. 4, 2014

Related U.S. Application Data

(60) Provisional application No. 61/830,227, filed on Jun. 3, 2013.

(51) Int. Cl.
*G06K 9/54* (2006.01)
*G06F 17/30* (2006.01)
*G06K 9/00* (2006.01)

(52) U.S. Cl.
CPC .. *G06F 17/30038* (2013.01); *G06F 17/30041* (2013.01); *G06F 17/30044* (2013.01); *G06K 9/00664* (2013.01); *G06K 2209/27* (2013.01)

(58) Field of Classification Search
CPC ......... G06F 17/30038; G06F 17/30044; G06F 17/30041; G06K 9/62
USPC .................................................. 382/305, 306
See application file for complete search history.

(56) References Cited

U.S. PATENT DOCUMENTS

| | | | |
|---|---|---|---|
| 7,685,198 B2 | 3/2010 | Xu | |
| 7,788,247 B2 | 8/2010 | Wang | |
| 7,953,796 B2 | 5/2011 | Brush et al. | |
| 8,031,170 B2 | 10/2011 | Brown et al. | |
| 8,341,219 B1 | 12/2012 | Young | |
| 2002/0080256 A1* | 6/2002 | Bates | G06K 9/00597 348/335 |
| 2007/0173956 A1* | 7/2007 | Koch | G06F 17/30241 700/6 |
| 2009/0094189 A1 | 4/2009 | Stephens | |
| 2009/0192998 A1 | 7/2009 | Paulsen | |
| 2009/0254614 A1 | 10/2009 | Brush et al. | |

(Continued)

FOREIGN PATENT DOCUMENTS

| | | |
|---|---|---|
| CN | 102763105 | 10/2012 |
| TW | 201303612 | 1/2013 |

OTHER PUBLICATIONS

WO patent application No. PCT/US14/39197, International Search Report and Written Opinion mailed Sep. 24, 2014.

(Continued)

*Primary Examiner* — Andrew Moyer
(74) *Attorney, Agent, or Firm* — Weaver Austin Villeneuve & Sampson LLP

(57) ABSTRACT

In one embodiment, a set of tags that has been generated by performing computer vision analysis of image content of a visual media item may be obtained, where each tag of the set of tags has a corresponding probability. In addition, a set of information that is independent from the image content of the visual media item may be obtained. The probability of at least a portion of the set of tags may be modified based, at least in part, upon the set of information.

23 Claims, 10 Drawing Sheets

(56) References Cited

U.S. PATENT DOCUMENTS

| | | | |
|---|---|---|---|
| 2010/0241739 A1* | 9/2010 | Reus | G06F 21/62 709/222 |
| 2011/0026835 A1* | 2/2011 | Ptucha | G06F 17/30247 382/209 |
| 2011/0208722 A1* | 8/2011 | Hannuksela | 707/723 |
| 2012/0066286 A1 | 3/2012 | Heredia et al. | |
| 2012/0124034 A1 | 5/2012 | Jing et al. | |
| 2012/0131032 A1* | 5/2012 | Rakshit | 707/767 |
| 2013/0212529 A1* | 8/2013 | Amarnath | G06F 3/017 715/810 |
| 2013/0250139 A1* | 9/2013 | Doan | H04M 1/72522 348/231.3 |
| 2014/0359015 A1 | 12/2014 | Pesavento et al. | |

OTHER PUBLICATIONS

Facebook, "How Sharing Works," Facebook © 2014, downloaded from https://www.facebook.com/about/sharing.

WO patent application No. PCT/US14/39218, International Search Report and Written Opinion mailed Sep. 24, 2014.

Wikipedia, "Computer Vision," page last modified May 8, 2014, downloaded from http://en.wikipedia.org/wiki/Computer_vision.

U.S. Appl. No. 14/290,223, Office Action mailed Dec. 10, 2015.

TW patent application No. 103118543, Office Action mailed Oct. 23, 2015.

TW patent application No. 103118543, Notice of Allowance mailed Feb. 24, 2016.

TW patent application No. 103118363, Office Action mailed Dec. 10, 2015.

U.S. Appl. No. 14/290,223, Office Action mailed Apr. 28, 2016.

TW patent application No. 103118363, Decision of Rejection mailed Mar. 25, 2016.

TW patent application No. 105109391, Office Action mailed Aug. 8, 2016.

U.S. Appl. No. 14/290,223, Office Action mailed Oct. 17, 2016.

WO patent application No. PCT/US14/39197, International Preliminary Report on Patentability and Written Opinion mailed Dec. 8, 2015.

WO patent application No. PCT/US14/39218, International Preliminary Report on Patentability and Written Opinion mailed Dec. 8, 2015.

* cited by examiner similarity tag processor photo  similar photo user tag: eiger similarity weight: 0.85,
tag: eiger 0.85

PHOTO AND VIDEO SEARCH

RELATED APPLICATIONS

This application claims priority from U.S. Provisional Application No. 61/830,227, entitled "Photo and Video Search," by Pesavento et al, filed on Jun. 3, 2013, which is incorporated herein by reference in its entirety and for all purposes.

BACKGROUND OF THE INVENTION

The disclosed embodiments relate generally to computer-implemented methods and apparatus for performing automated tagging of electronic visual media items to facilitate the search and organization of electronic visual media items.

With the proliferation of mobile devices such as smartphones and tablets, visual media such as photos and videos are being collected in increasing volumes. Users often store the visual media on their mobile devices, as well as upload their visual media for storage via a number of services and media storage websites. To enable the visual media to be retrieved at a later time, users may manually tag their visual media with titles or categories.

Unfortunately, the manual tagging of visual media is considered by many users to be time-consuming and tedious. Furthermore, the manual tagging of visual media is often not feasible due to the large volume of visual media that many users accumulate. As a result, many users neglect tagging their visual media.

SUMMARY OF THE INVENTION

The disclosed embodiments enable tags associated with visual media items to be computer-generated. Visual media items may include, but are not limited to, photos and videos. The generated tags may be used to facilitate search and organization of media items.

In one embodiment, a set of tags that has been generated by performing computer vision analysis of image content of a visual media item may be obtained, where each tag of the set of tags has a corresponding probability. In addition, a set of information that is independent from the image content of the visual media item may be obtained. The probability of at least a portion of the set of tags may be modified based, at least in part, upon the set of information.

In another embodiment, computer vision analysis of image content of a visual media item may be performed to generate a set of tags, each tag of the set of tags having a corresponding probability. A set of information that is independent from the image content of the visual media item may be obtained. The probability associated with at least a portion of the set of tags may be modified based, at least in part, upon the set of information.

In another embodiment, the invention pertains to a device comprising a processor, memory, and a display. The processor and memory are configured to perform one or more of the above described method operations. In another embodiment, the invention pertains to a computer readable storage medium having computer program instructions stored thereon that are arranged to perform one or more of the above described method operations.

These and other features and advantages of the present invention will be presented in more detail in the following specification of the invention and the accompanying figures which illustrate by way of example the principles of the invention.

DETAILED DESCRIPTION OF THE SPECIFIC EMBODIMENTS

Figure 1:
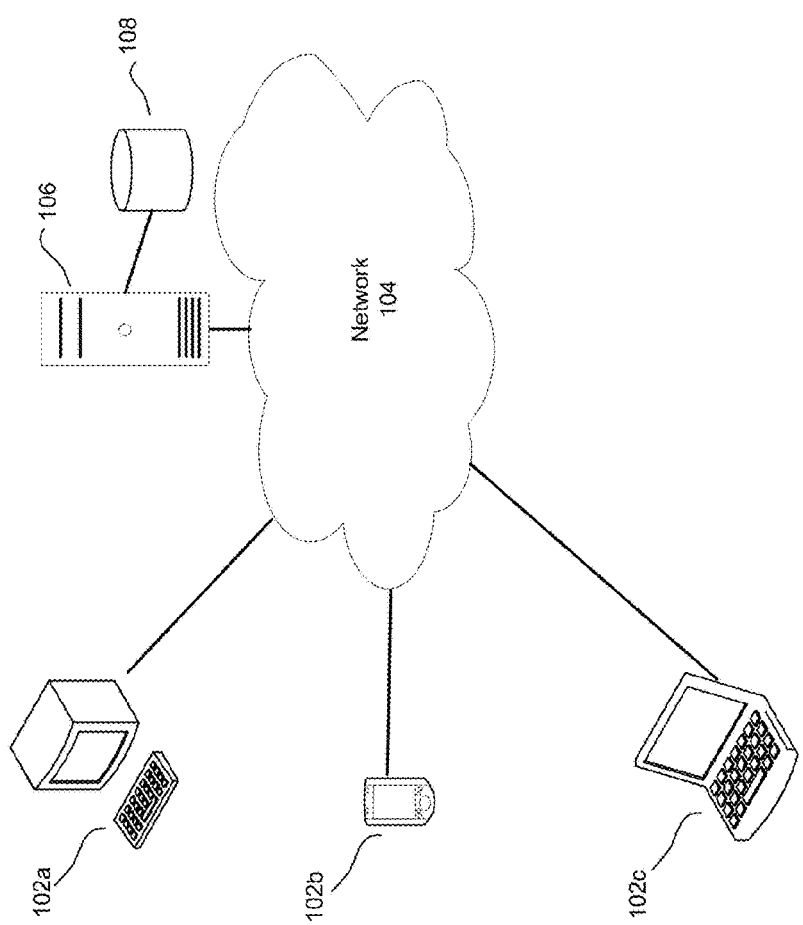
FIG. 1 is a diagram illustrating an example system in which embodiments of the invention may be implemented.

Reference will now be made in detail to specific embodiments of the disclosure. Examples of these embodiments are illustrated in the accompanying drawings. While the disclosure will be described in conjunction with these specific embodiments, it will be understood that it is not intended to limit the disclosure to these embodiments. On the contrary, it is intended to cover alternatives, modifications, and equivalents as may be included within the spirit and scope of the disclosure as defined by the appended claims. In the following description, numerous specific details are set forth in order to provide a thorough understanding of the disclosure. The disclosed embodiments may be practiced without some or all of these specific details. In other instances, well known process operations have not been described in detail in order not to unnecessarily obscure the disclosure. The Detailed Description is not intended as an extensive or detailed discussion of known concepts, and as such, details that are known generally to those of ordinary skill in the relevant art may have been omitted or may be handled in summary fashion Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

In recent years, the Internet has been a main source of information for millions of users. These users rely on the Internet to search for information of interest to them. One conventional way for users to search for information is to initiate a search query through a search service's web page. Typically, a user can enter a query including one or more search term(s) into an input box on the search web page and then initiate a search based on such entered search term(s). In response to the query, the search service typically returns an ordered list of search result documents.

To retrieve documents of interest to a user, the user typically submits a search query via a search service, and the search service returns a list of search result documents in response to the user's search query. However, the ability of users to search for visual media items such as photos and videos is limited by the users' ability to manually tag (i.e., annotate) and organize their visual media items.

Users may manually organize their visual media through the use of folders (i.e., albums). More particularly, users may manually create folders with desired titles. For example, visual media items are typically placed in folders organized by time, location, subject or event. The visual media may then be moved to the pertinent folders. For example, a visual media item may be stored in a particular folder by cutting and pasting the visual media item into the desired folder or dragging and dropping the visual media item into the pertinent folder. However, where a visual media item is pertinent to more than one folder, the visual media item generally needs to be duplicated to multiple folders. Furthermore, with the volume of visual media increasing exponentially, few users have the time or patience to organize their visual media.

In addition, digital visual media may be tagged manually. More particularly, users may tag a given visual media item with one or more tags. Each tag may include text that pertains to the visual media item. For example, the text may include a title or category. However, many users do not have the time to dedicate to tagging their visual media. As a result, the tags for many visual media items may be incomplete or missing entirely.

Even where visual media items are tagged, the ability to search for visual media items is limited by the accuracy with which the visual media items are tagged. Often, searching the visual media items can require a user to scroll through thousands of visual media items. Accordingly, users are often frustrated with the limited ability to search and browse visual media items.

Many services and web sites are available for sharing visual media items. However, due to the lack of tags, visual media items cannot easily be grouped by topics such as scene, object, or event. Accordingly, users cannot easily identify visual media items that they might otherwise wish to share with others.

In accordance with various embodiments, visual media may be processed to automatically generate or refine metadata including a set of tags such that the metadata is associated with the visual media. More particularly, through an automated tagging process, a visual media item may be associated with metadata including a set of one or more tags, where each tag has a probability (i.e., weight) associated therewith. The metadata associated with a visual media item may be generated and/or refined, as will be described in further detail below.

Metadata that is generated or refined may be used to facilitate the search of visual media items. In addition, the metadata may be used to facilitate the organization of visual media items.

An electronic visual media item may include one or more digital images. For example, an electronic visual media item may include a video, photograph (i.e., photo), or electronically generated image such as a diagram or chart. A photo generally includes a visual image, while a video generally includes moving visual images. For example, a video may include a movie or a video clip. An electronic visual media item may be stored in the form of a file in a suitable format.

Visual media items may be captured by a camera of a mobile device, which may also be referred to as a portable device, a wearable device, or a handheld device. For example, photos and videos may be generated in a digital format using a digital camera. Alternatively, photos and videos that were not initially generated in a digital format may be converted to a digital format.

Various embodiments may be implemented, at least in part, by a mobile device and/or a remotely located server that is located in a remote location with respect to the mobile device. Examples of a mobile device include, but are not limited to, a cellular telephone, a smart phone, a camera, a video recorder, a display pager, a Personal Digital Assistant (PDA), a handheld computer, a tablet computer, and a laptop computer.

Example System

FIG. 1 is a diagram illustrating an example system in which embodiments of the invention may be implemented. As shown in FIG. 1, the system may include one or more servers 106 associated with a web site such as a social networking web site. Examples of social networking web sites include Yahoo, Facebook, Tumblr, LinkedIn, Flickr, and Instagram. The server(s) 106 may enable the web site to provide a variety of services to its users. More particularly, users of the web site may maintain public user profiles, interact with other members of the web site, upload files (e.g., photographs, videos), etc.

The server(s) 106 may include a search server and a web server. A plurality of clients 102*a*, 102*b*, 102*c* may access a search application (i.e., search service), for example, on the search server via network 104 and/or access a web application, for example, on the web server. The network 104 may take any suitable form, such as a wide area network or Internet and/or one or more local area networks (LAN's). The network 104 may include any suitable number and type of devices, e.g., routers and switches, for forwarding search or web object requests from each client to the search or web application and search or web results back to the requesting clients.

The invention may also be practiced in a wide variety of network environments (represented by network 104) including, for example, TCP/IP-based networks, telecommunications networks, wireless networks, etc. In addition, the computer program instructions with which embodiments of the invention may be implemented may be stored in any type of computer-readable media, and may be executed according to a variety of computing models including a client/server model, a peer-to-peer model, on a stand-alone computing device, or according to a distributed computing model in which various of the functionalities described herein may be effected or employed at different locations.

A search application generally allows a user (human or automated entity) to search for information that is related to a search query including one or more search terms. The search terms may be entered by a user in any manner. For example, a graphical user interface may present an input feature to the client (so the user can enter a query including one or more search term(s). More particularly, the graphical user interface may present an input box (i.e., search query section) into which a user may type a query including any number of search terms or portion thereof. In some embodiments, suggested search queries (i.e., search suggestions) may be provided. The user may then select one of the suggested search queries to submit to the search application via the graphical user interface.

The search query may then be executed via a search application with respect to one or more data sources. The data sources may include local data sources (e.g., on the client) and/or data sources that are remotely located via the network 104. In some embodiments, natural language processing (NLP) may be performed to interpret user queries and their intent. In response to the search query, the search application may identify and present information, which may include documents or visual media items that are most relevant to the user's search query.

The search application may be installed and executed via the server(s) 106 such as the search server and/or web server. The search application may be implemented on any number of servers although a single server 106 is illustrated for clarity. In other embodiments, the search application may be installed and executed on the client device.

In addition, in accordance with various embodiments, visual media items may be automatically organized and presented. Such organization may facilitate the search or browsing by a user.

To facilitate the search and/or organization of visual media items, the visual media items may be automatically tagged with a set of tags. Search and/or organization of the visual media items may then be performed based, at least in part, upon associated tags, which may include the automatically generated tags. Of course, tags associated with visual media items may also include manually generated tags. Various methods and mechanisms for performing automated tagging will be described in further detail below.

Embodiments disclosed herein may be implemented via the search server 106 and/or other server(s) and/or the clients 102*a*, 102*b*, 102*c*. For example, various features may be implemented via a web browser and/or application on the clients 102*a*, 102*b*, and 102*c*. The disclosed embodiments may be implemented via software and/or hardware.

The search server 106 (or servers) may retain one or more query logs into which search information is retained. For example, the query logs may be retained in one or more memories 108 that are coupled to the server(s) 106. Each time a user performs a search on one or more search terms, information regarding such search may be retained in the query logs. For instance, the user's search request may contain any number of parameters, such as user or browser identity and the search terms, which may be retained in the query logs. Additional information related to the search, such as a timestamp, may also be retained in the query logs along with the search request parameters. When results are presented to the user based on the entered search terms, parameters from such search results may also be retained in the query logs. For example, an identity of the specific search results (e.g., URLs), such as the web sites, the order in which the search results are presented, whether each search result is a sponsored or algorithmic search result, the owner (e.g., web site) of each search result, and/or whether each search result is selected (i.e., clicked on) by the user (if any), may be retained in the query logs.

In addition, the memories 108 may store one or more user logs (e.g., user databases) that retain user information. This user information or a portion thereof may be referred to as a user profile. More particularly, the user profile may include public information that is available in a public profile and/or private information. Furthermore, the user profile may include information that has been submitted by the user and/or information that has been deduced or automatically collected by the system (e.g., based upon user action(s)). The user information retained in the user logs may include personal information such as demographic information (e.g., age and/or gender) and/or geographic information (e.g., Global Positioning System (GPS) location, Internet Protocol (IP) address, country region/state, city, and/or zip code), which may include or indicate the user's residence address, work address, and/or current location. In addition, the user information may indicate interests of the user, products or services purchased by the user, properties (e.g., categories) of information that the user commonly accesses on the Internet, and/or a profession of the user. A user may be identified in the user logs by a user ID (e.g., user account ID), information in a user cookie, etc. The user logs may be retained in one or more memories.

A variety of mechanisms may be implemented to generate a profile including, but not limited to, collecting or mining navigation history, stored documents, tags, or annotations, to provide a few examples. A profile builder may store a generated profile. Profiles of users of a search engine, for example, may give a search engine provider a mechanism to retrieve annotations, tags, stored pages, navigation history, or the like, which may be useful for making relevance determinations of search results, such as with respect to a particular user.

The disclosed embodiments enable visual media items to be tagged, searched, browsed, organized, and/or otherwise provided to users in response to a search query or other indicator of interest in the visual media items. More particularly, the server(s) 106 may provide visual media items or identifiers thereof to users via the web site (e.g., via display on a web page of the web site), via electronic mail, Short Message Service (SMS), via a mobile device (e.g., text message), or via another medium such as digital television, which may be connected to the Internet.

Figure 2:
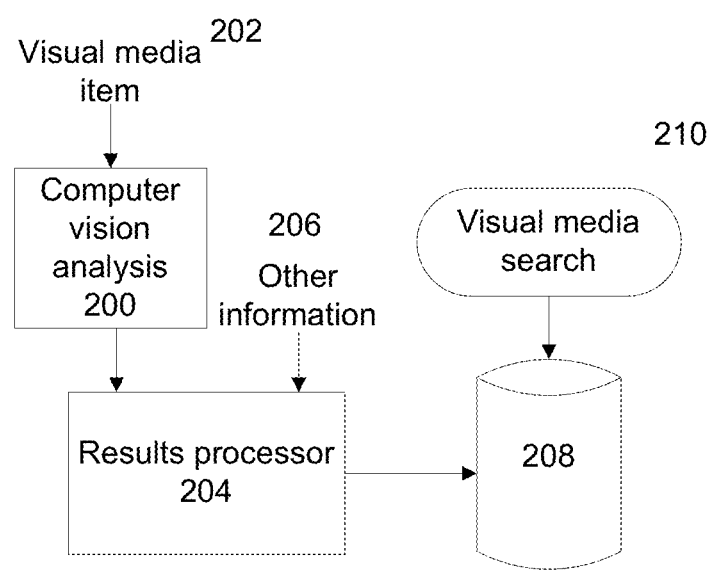
FIG. 2 is a block diagram illustrating an example system in which various embodiments may be implemented.

FIG. 2 is a block diagram illustrating an example system in which various embodiments may be implemented. Computer vision analysis 200 may be performed for a visual media item 202 such as a photo or video to generate a set of tags. In addition, the computer vision analysis 200 may be performed such that each of the set of tags has a corresponding probability associated therewith, where the probability indicates a likelihood that the tag accurately describes image content of the visual media item. The computer vision analysis 200 may be performed at a time that the visual media item 202 is captured, at a time that the visual media item 202 is uploaded, or at a later time.

A results processor 204 may obtain the set of tags and probabilities associated therewith that has been generated via the computer vision analysis 200 and other information 206 that is independent from (e.g., external to) the image content of the visual media item 202. The results processor 204 may analyze the set of tags and the other information 206. Such analysis may include examining the interrelationships among the set of tags and the other information 206. The results processor 204 may revise the probabilities associated with the set of tags, thereby improving or refining the set of tags that was generated via computer vision analysis. In this manner, the accuracy of the automated tagging process is improved. The set of tags and associated probabilities may be stored to a tag database 208. The results processor 204 may refine the set of tags for the visual media item 202 at the time that the visual media item 202 is captured, at the time that the visual media item 202 is uploaded, or at a later time.

Although the results processor 204 is shown in this example as a single entity, this example is merely illustrative. Therefore, the results processor 204 may be implemented via multiple processors or devices.

In accordance with some embodiments, a visual media item may be processed as described herein to generate a set of tags if the visual media item does not have tags associated therewith. As a result, if a visual media item has already been manually tagged, the system may not generate a set of tags for the visual media item. In accordance with other embodiments, a visual media item may be processed as described herein even if the visual media item already has tags associated therewith. In other words, it may be desirable to process a visual media item even if the visual media item has been previously processed or has been manually tagged. Thus, a set of automatically generated tags may be added to previously existing tags for a particular visual media item.

A user may also manually generate tag(s) associated with a visual media item at any time. Manually generated tags may be initialized with a particular probability. For example, manually generated tags may be assigned a probability of 100 percent.

A visual media search 210 may be performed via the tag database 208 to filter and retrieve visual media using the tags associated with the visual media. In some embodiments, the tags may be retrieved further based, at least in part, upon the probabilities associated with the tags. In addition, visual media items may be automatically organized using the tag database 208. The tag database 208 may be implemented via one or more memories, which may be implemented locally (e.g., at the client) and/or remotely (e.g., at the server(s) or cloud).

Figure 3:
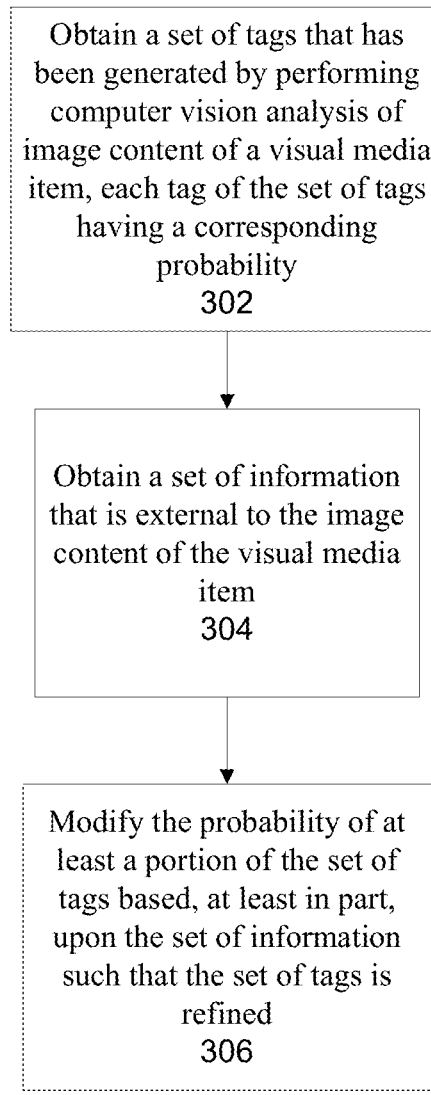
FIG. 3 is a process flow diagram illustrating an example method of tagging visual media items in accordance with various embodiments.

FIG. 3 is a process flow diagram illustrating an example method of tagging visual media items in accordance with various embodiments. A visual media item may be obtained or identified. For example, the visual media item may be captured, uploaded, retrieved from storage, or otherwise identified. Thus, the tagging process may be performed at the time of capture of the visual media item, at the time of uploading the visual media item, or at a later time (e.g., upon retrieval of the visual media item).

A set of tags that has been generated by performing computer vision analysis of image content of a visual media item may be obtained at 302, where each tag in the set of tags has a corresponding probability (i.e., weight) indicating a likelihood that the tag accurately describes or pertains to the image content of the visual media item. More particularly, the computer vision analysis of the image content of the visual media item may be performed to generate the set of tags (and corresponding probabilities) or, alternatively, may be performed (e.g., by another entity) prior to obtaining the set of tags (and corresponding probabilities). The set of tags may be stored in a tag database such that each tag is stored in association with the corresponding probability.

Computer vision analysis may be performed to detect objects and/or scenes within image content of the visual media item. Thus, each tag that is generated may identify an object represented in the visual media item or a scene describing the visual media item. For example, an object may include text, an item, a face, a person, a particular individual, or a group of individuals. A scene may include, but is not limited to, a theme, setting, location, area, or event.

A set of information that is independent from (e.g., external to) the image content of the visual media item may be obtained at 304. The set of information or portion thereof may be stored in association with the visual media item. In some instances, the set of information or portion thereof may be associated with a particular tag in the set of tags. Examples of various types of information that may be obtained will be described in further detail below.

The probability associated with at least a portion of the set of tags may be modified at 306 based, at least in part, upon the set of information such that the set of tags is refined. For example, the probability associated with a tag in the set of tags may be increased or decreased. Thus, the probability associated with one or more tags may be updated in the tag database. As a result, the modified probabilities may indicate whether the set of tags generated via the computer vision analysis is accurate, thereby improving the accuracy of the probabilities and tags. The set of tags may be stored in a tag database such that each tag is stored in association with a corresponding probability indicating a likelihood that the tag accurately describes or pertains to image content of the visual media item. In this manner, the probability of detection of objects or scenes may be improved.

In addition, the set of tags may also be modified by adding a further tag with a corresponding probability. For example, a location tag corresponding to a GPS location or a date may be added to the set of tags with a probability of 100 percent. Similarly, the set of tags may be modified by removing a tag from the set of tags. For example, where a modified probability associated with a given tag is lower than a minimum threshold amount, this may indicate that the tag is not relevant to the visual media item and the tag may be removed from the set of tags.

In some embodiments, the set of tags may be visible to users viewing the visual media item. In other embodiments, tags having a probability above a threshold amount (e.g., 80 percent) may be presented to a user viewing the visual media item, while tags having a probability below the threshold amount may not be presented to the user viewing the visual media item. In some embodiments, the probabilities associated with the tags may be displayed to users.

A graphical user interface may enable a user to submit a search query to retrieve pertinent visual media items. Such a graphical user interface may be presented via a device such as a mobile device, as well as a remotely located server such as a web server. In some embodiments, when a user enters a search query or portion thereof, the graphical user interface may present suggested queries. Such suggested queries may be generated based, at least in part, upon the tags associated with the visual media and/or a search context. The search context may include, but is not limited to, a location of a client device accessed by the user and/or user information associated with the user such as that maintained in a user profile.

In some embodiments, the search query may be processed with respect to a particular data source, folder or album. In other embodiments, the search query may be processed with respect to multiple data sources, folders or albums. The data source(s) from which visual media items are searched may be statically configured or, alternatively, may be user-selectable or configurable.

When a user performs a search of visual media items, the tags associated with the visual media items may be searched. In some embodiments, a search engine may identify those visual media items that are most likely to be relevant to the user's search query based, at least in part, upon the probabilities associated with tags of the visual media items. More particularly, the search engine may consider the probabilities of those tags that either match terms in the user's search query or are otherwise relevant to the user's search query. Therefore, the identified visual media items may be ranked based, at least in part, upon the probabilities associated with the tags deemed to be pertinent to the user's search query and presented according to the ranking.

In some embodiments, the visual media items may be automatically organized (e.g., indexed) based, at least in part, upon the corresponding tags. In addition, the organization may be further based, at least in part, upon probabilities associated with the tags. The automated organization of visual media items may be performed according to various tags or metadata including, but not limited to, time, events, places, people, scenes, objects, text, and/or similarity. Such organization may facilitate efficient retrieval of the visual media items during browsing. In addition, the organization may enable a user to identify specific folder(s) via which to perform a visual media search.

The processing described herein may be performed on a mobile device and/or a remotely located server. In some implementations, at least a portion of the processing may be performed by a software application installed on the mobile device. The visual media and associated metadata may be stored at one or more locations, which may include, but are not limited to, one or more mobile devices, computer memories, storage devices, service providers, and/or web-based services.

Computer Vision Analysis of Image Content of Visual Media Items

Computer vision analysis may be performed on image content of a visual media item using a variety of computer vision analysis techniques and software tools. Computer vision analysis techniques and tools may enable the image content of a visual media item to be analyzed such that a set of tags identifying objects and/or scenes in the visual media item is generated. Examples of such computer vision analysis techniques and tools will be described below.

Text detection may be performed on the visual media item to identify text characters via optical character recognition (OCR). For example, the location of text and/or a bounding box defining an area including the text may be ascertained. Text recognition may also be performed to recognize words such as "beach," "mountain," or "San Francisco" in the text characters. NLP may be performed to facilitate text recognition.

Barcode detection may be performed to detect a barcode within image content of a visual image. In addition, barcode recognition may be performed to ascertain a barcode number or otherwise perform barcode translation.

Facial analysis may be performed to detect a face (e.g., a person) or facial features such as a smile, frown, blink, red-eye, or orientation of a face detected in a visual media item. In addition, a number of faces (or people) in a visual media item, a location of faces (or people) within the visual media item, and/or a bounding box defining an area of the visual media item in which the face(s) (or people) are located may be ascertained.

Facial recognition may also be performed to recognize a particular face as a specific individual (e.g., John, Sarah, etc.). A probability may indicate a likelihood that the individual identified via facial analysis is accurate.

Object recognition may also be performed to identify objects in the visual media item. For example, the location of an object and/or a bounding box defining an area of the visual media item that includes the object may be ascertained. Objects may include items or entities such as cars or bicycles. In addition, objects may include people such as an individual or a group of individuals. A probability may indicate a likelihood that the object in the visual media item has been correctly identified.

Scene recognition may be performed to identify a scene of a visual media item. For example, a scene may be recognized as a beach or mountain. In addition, a probability may indicate a likelihood that the identified scene accurately describes the image content of the visual media item.

Color analysis may be performed to detect one or more colors in the image. More particularly, the color analysis may detect dominant colors in the image content. In some embodiments, the color analysis may ascertain locations of various colors in the image content. Moreover, the color analysis may determine that an object in the visual media item is a particular color. For example, the color analysis may determine that the visual media item includes a red car.

Quality analysis may also be performed to determine a quality of the visual media item. For example, the quality analysis may determine whether a photo is blurry or has a limited amount of contrast. The quality analysis may be used to estimate a probability that a tag generated via the computer vision analysis accurately describes the corresponding object or scene. Where the quality analysis determines that the quality of an image in the visual media item is low, one or more tags that have been generated may be assigned a low probability of accuracy. For example, where the photo is significantly blurry, the probability that a given tag is accurate may be set to 20%.

Information External to Image Content of Visual Media Items

Various types of information may be obtained to refine a set of tags generated via computer vision analysis. More particularly, one or more types of information may be applied separately or in combination to modify a set of tags generated via computer vision analysis (e.g., by modifying probabilities associated with at least a portion of the set of tags), as appropriate. Examples of types of information that may be applied to modify tag probabilities will be described in further detail below.

Metadata

When visual media such as photos are captured via a camera, the visual media are often automatically tagged with metadata such as a time or location. However, as photos are copied, cropped, or transferred, this metadata is often lost.

In accordance with various embodiments, metadata that is automatically captured by a mobile device including a camera may be leveraged to further refine automated tags generated via computer vision analysis. The metadata may include, but is not limited to, an indication of a particular geographic location, a date, and/or a time at which the visual media item was captured. For example, the geographic location may include a particular city, state, and/or country. As another example, the date may identify a particular day, month, and/or year. The metadata may also indicate an identity of an object or individual in a vicinity of the mobile device at the time that the mobile device captured the visual media item The metadata may also include Exchangeable Image File (EXIF) data. Mobile devices including a digital camera typically record EXIF data with each image that is captured. The EXIF data may indicate an exact time and date that a photo was captured. In addition, the EXIF data may also indicate information such as the orientation of the image, the camera type, and settings such as aperture, focal length, whether the flash was on at the time that the image was captured, and whether the flash was fired at the time that the image was captured.

In addition, metadata may be acquired via one or more sensors of a mobile device at a time that the mobile device captured the visual media item. Such sensors may include, for example, Infra-red (IR) sensors, Radio Frequency Identifier (RFID) sensors, accelerometers, and/or Global Positioning System (GPS) sensors. Thus, the metadata may indicate an orientation of the mobile device and/or sound detected via the mobile device.

Sensors

Figure 4:
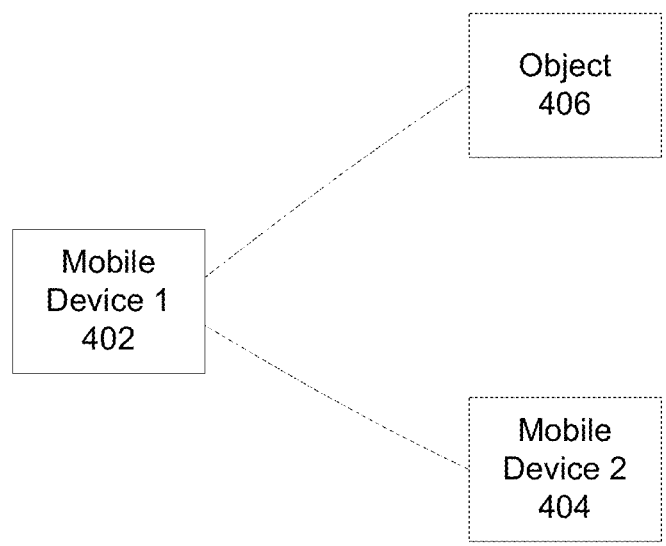
FIG. 4 is a diagram illustrating the use of metadata obtained via sensors of a mobile device in accordance with various embodiments.

FIG. 4 is a diagram illustrating the use of metadata obtained via sensors of a mobile device in accordance with various embodiments. As shown in this example, a first mobile device 402 having a camera may capture a visual media item such as a photo or video clip. Other objects or devices may emit signals that may be used to uniquely identify the objects or devices. Using such signals, it is possible to verify whether tags generated via computer vision analysis are accurate. More particularly, the signals may be used to "boost" probabilities associated with various tags.

For example, the first mobile device 402 may take a first photo of Person A who has a second mobile device 404 that emits a first signal such as an IR or RFID signal. The first mobile device 402 may sense the first signal at the time that the first photo is taken. Where a set of tags is generated via computer vision analysis, one of the tags may identify Person A with a probability of 62%. Based upon the first signal, the first mobile device 402 may sense that the second mobile device 404 is Person A's mobile device. As a result, the probability associated with this tag may be increased from 62% to 100%. In this manner, the results of facial recognition that has been performed may be "boosted." Accordingly, the accuracy of detection of individuals in a visual media item and corresponding tag generation may be improved.

As another example, the first mobile device 402 may take a second photo of an Object 406 that emits a second signal such as a RFID signal. The first mobile device 402 may sense the second signal at the time that the second photo is taken. Since the second signal indicates that the Object 406 is a traffic light, the second signal may be used to modify the probability associated with a tag identifying the Object 406. For example, where the tag previously identified a utility pole with a probability of 50% and the second signal indicates that the Object 406 is a traffic light, the probability associated with the tag may be reduced to a probability of 20%. In this manner, object detection accuracy may be improved in a variety of environments where objects emit signals via RFID tags or other technology.

Location

A Global Positioning System (GPS) may determine GPS coordinates identifying a location of a mobile device at the time that a visual media item is captured via a camera of the mobile device. The GPS coordinates may be used to refine a set of tags generated via computer vision analysis. More particularly, the probabilities associated with at least one of the set of tags may be modified based, at least in part, upon the GPS coordinates. For example, the GPS coordinates may be translated into a multiplier, which may be multiplied by the probability associated with a tag.

The location at which the visual media item was captured may be used to improve the probability of scene or object recognition accuracy. For example, where a visual media item is a photo of a beach or other landmark, computer vision analysis may ascertain that the probability associated with a tag "beach" is 56 percent. If the location is near the ocean, the probability associated with the tag "beach" may be increased to 80 percent. As another example, where a tag generated via computer vision analysis is "baseball" and the location is a stadium, the probability associated with the tag may be increased. Accordingly, the probability of scene or object recognition accuracy may be increased (e.g., by a particular amount) based, at least in part, upon the location at which the visual media item was captured.

Figure 5:
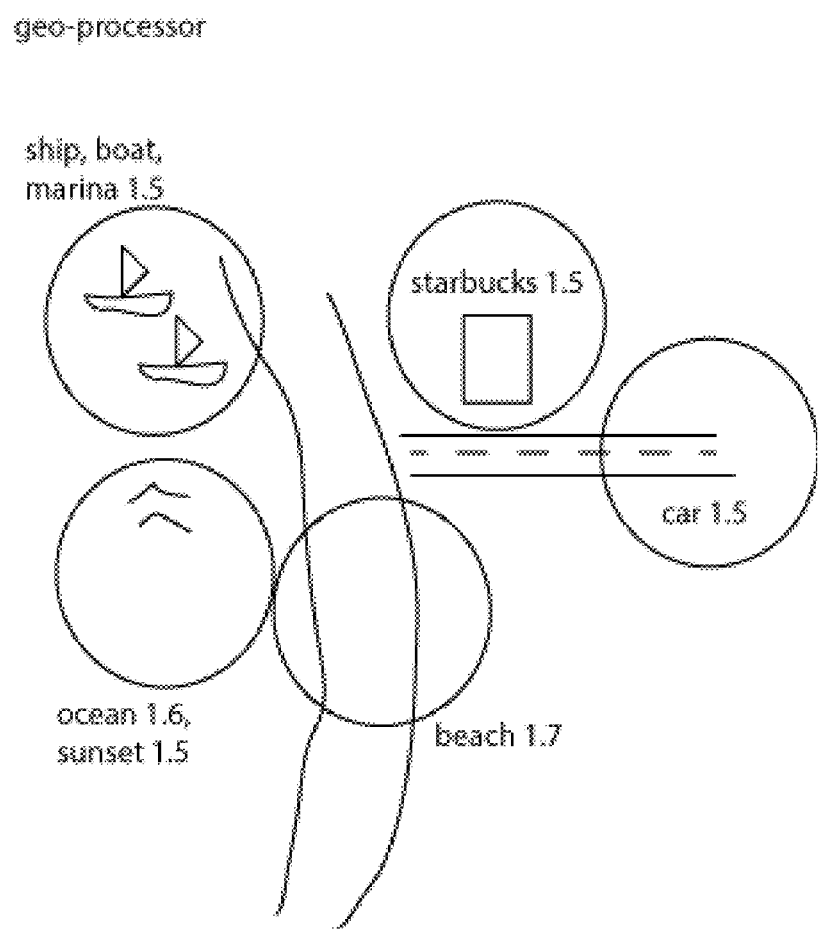
FIG. 5 is a diagram illustrating an example system in which coordinates may be used to modify tag probabilities in accordance with various embodiments.

FIG. 5 is a diagram illustrating an example system in which coordinates may be used to modify tag probabilities in accordance with various embodiments. As shown in this example, a map may be used to ascertain which location on the map the coordinates identify. At least one of the set of tags generated by a computer vision analysis system may be modified based, at least in part, upon whether the tag(s) are likely to be accurate given the particular location at which the visual media item was captured. For example, the GPS coordinates may identify a marina, an ocean, a beach, a street, or Starbucks coffee shop. If a visual media item such as a photo is taken on a street, the object that is tagged by a computer vision analysis system as a car is more likely to be a car than an ocean.

EXIF Data and Tags

The date and/or time at which a visual media item has been captured may be particularly useful where two or more visual media items have been captured via a mobile device within a particular threshold period of time. More particularly, if the EXIF data or other metadata indicates that two visual media items were captured within a particular predefined threshold period of time from one another, it is more likely that a tag of one of the two visual media items may pertain to the other media item.

Where a first one of the visual media items has been manually tagged by a user with one or more tags and a second one of the visual media items has not been manually tagged by the user, the tags associated with the first visual media item may be obtained to further refine the set of tags of the second visual media item that has been generated via computer vision analysis. For example, where a first photo has been tagged with the event "Mary's wedding," it is likely that a second photo taken 5 minutes later also pertains to "Mary's wedding." Thus, the manually generated tags of a first visual media item may be used to boost results of computer vision analysis of a second visual media item.

Similarly, where a first one of the visual media items has a tag with a relatively high probability (e.g., 90 percent), the tag may be useful in further refining tags of a second one of the visual media items, where both of the visual media items have been captured within a particular threshold period of time within one another. For example, consider two different photos taken 5 minutes apart, but the second photo is slightly blurry. Where a first set of tags that is computer generated for the first photo includes a tag "Person A" with a probability of 90 percent and a second set of tags that is computer generated for the second photo includes a tag "Person A" with a probability of 50 percent, the probability associated with the tag "Person A" may be increased to 90 percent for the second photo.

As discussed above, tag probabilities associated with visual media items captured within a particular threshold period of time from one another may be propagated or combined. The tags may be manually or automatically generated. For example, the tags may identify scenes, events, people, or other suitable labels.

Similarity Analysis

Similarity analysis may be performed to identify two or more visual media items that are visually similar. More particularly, computer vision analysis may identify visual characteristics that are shared between the visual media item and the other media items. Thus, it is possible to identify visual media items depicting the same or similar scenes or objects.

In some embodiments, a similarity weight may be assigned to other visual media items, where a similarity weight indicates a degree with which another visual media item is similar to the visual media item. A set of visual media items that are most visually similar to the visual media item may be identified by ranking visual media items according to their similarity weights. In some embodiments, visual media items are considered to be visually similar to another visual media item if its similarity weight is above a predefined similarity threshold. In this manner, computer vision analysis may be performed with respect to a visual media item and other visual media items to identify a set of visual media items that are visually similar to the visual media item.

A set of tags associated with each similar visual media item in the set of visually similar media items may be ascertained, where each tag of the set of tags associated with a similar visual media item has a corresponding probability. Where a tag in the set of tags has a high probability of being accurate, the probability of a corresponding tag (e.g., identical or similar tag) associated with the visual media item may be modified (e.g., by increasing the probability associated with the tag of the visual media item). For example, where a first photo has been tagged by a user with the tag "baseball" and a second photo that is visually similar has been tagged via computer vision analysis with the tag "baseball" with a probability of 50 percent, the probability may be increased to 80 percent. Accordingly, the tags (and associated probabilities) of other visual media items may be used to further boost results of computer vision analysis of a particular visual media item if the other visual media items are deemed to be visually similar to the particular visual media item.

Figure 6:
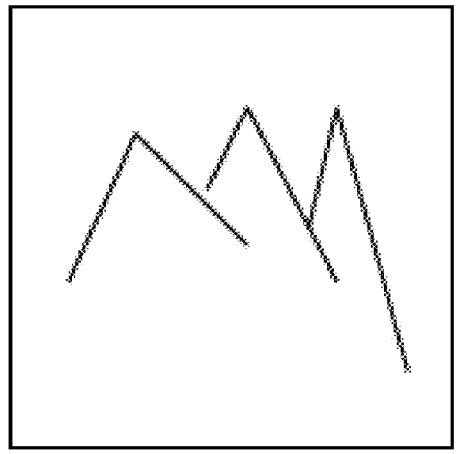
FIG. 6 is a diagram illustrating the identification of visually similar visual items in accordance with various embodiments.
Figure 6:
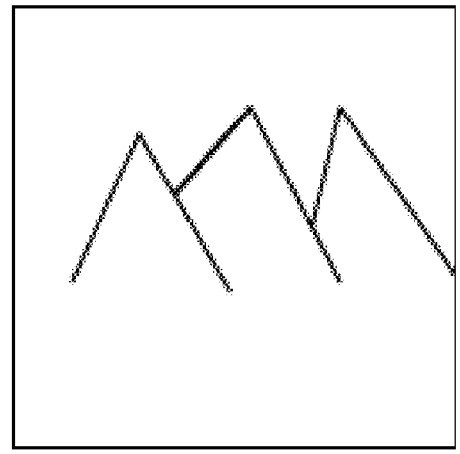

FIG. 6 is a diagram illustrating the identification of visually similar visual items in accordance with various embodiments. In this example, a user may tag a first photo with the text "Eiger," which is a mountain in the Alps. It may be determined that the first photo and a second photo are visually similar. As shown in this example, computer vision analysis may generate a similarity weight 0.85 and a tag "Eiger" having a corresponding probability 0.85 for the second photo. The tag probability associated with the second photo may be increased (e.g., to 0.95) due to its similarity to the first tagged photo.

Feature Learning and User Tags

Figure 7:
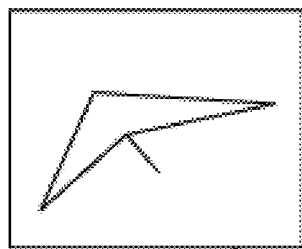
FIG. 7 is a block diagram illustrating an example application of unsupervised feature learning.
Figure 7:
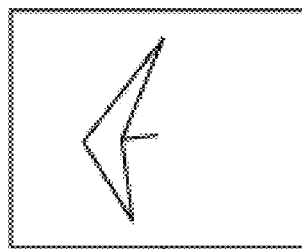
Figure 7:
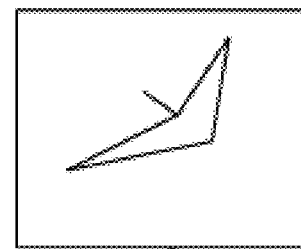

During computer vision analysis, unsupervised and/or supervised feature learning may be performed to train a computer-implemented model to identify specific objects or scenes. FIG. 7 is a block diagram illustrating an example application of unsupervised feature learning. As shown in this example, a user may tag one or more photos with a tag "hang glider." By performing computer vision analysis, the system is able to determine that the manually tagged photo(s) share visual features with other untagged photo(s). Where a manually tagged visual media item is ascertained to be visually similar to other untagged visual media item(s), the manually generated tag(s) may be used by the system to improve its ability to detect objects or scenes based upon their visual features. Specifically, the system may maintain a list of objects and/or scenes, where each object or scene is associated visual features of the corresponding object or scene. In this example, the system may improve its ability to accurately identify visual media items that depict a hang glider and the probability weight of the tag "hang glider" generated via computer vision analysis may be improved. In this manner, the system may improve its ability to identify, via computer vision analysis, an object or scene in an untagged visual media item through the use of manually generated tags associated with other visual media items.

Tag density associated with manually generated tags may also be applied to modify tag probabilities. For example, where a user uses a particular tag or combination of tags with a minimum threshold frequency, tag probabilities may be modified based, at least in part, upon the frequency with which the tag or tag combination is used.

Social Tags and Comments

Social tags and comments may also be used to refine tags generated via computer vision analysis. For example, if a user posts a comment pertaining to a visual media item or adds a further tag to a visual media item, these may be used to refine tags that are generated via computer vision analysis.

User Data

User data such as that maintained in a user profile may be leveraged to further refine results of computer vision analysis. For example, where the profile indicates that the user is interested in fishing and a tag "fishing" has been generated for a visual media item via computer vision analysis with a probability of 40 percent for one of the user's photos, the probability may be increased since it is particularly likely that the user did go fishing. Accordingly, user profile data such as user interests may be used to modify probabilities of tags that have been generated via computer vision analysis.

Calendar

A calendar may also be useful in refining tags generated via a computer vision analysis system. A calendar may indicate a date, time and/or location of one or more events. The calendar may be a calendar of the user, a group of users, or other calendar that may be publicly available. At least a portion of the information that is independent from the image content may be retrieved from a calendar. In some embodiments, a look up in one or more calendars may be performed to attempt to identify an event on the date and/or time at which the visual media item was captured. Once an event has been identified, probabilities associated with tag(s) in the computer-generated set of tags may be modified based, at least in part, upon the identified event. More particularly, a tag probability associated with an event may be increased if the visual media item has been captured during the event. Such an event may be a scheduled event, birthday, or other holiday. For example, during Christmas, the probability associated with the tag "Christmas tree" may be increased by a particular amount.

For example, suppose the computer vision analysis system generates a tag identifying a baseball game with a probability of 50 percent for a particular photo. A lookup in the user's calendar on the date that the photo was taken may indicate that the user planned to go to the baseball game on that day. In this instance, the probability associated with the tag "baseball game" may be increased to 90 percent.

As another example, suppose the computer vision analysis system generates a tag "snow" with a probability of 50 percent. If the user's calendar indicates that the user was going skiing on that day, the probability may be increased to 70 percent.

Tag Expansion

Tags may be automatically generated to expand upon tags generated via computer vision analysis or manually generated tags. For example, if a scene has been tagged as a "dog," an additional tag "animal" may be automatically generated. Automated tag expansion may be performed using various databases such as a dictionary, thesaurus, or other databases.

User Feedback

In accordance with various embodiments, a graphical user interface may provide a user input feature that enables a user to provide feedback pertaining to the accuracy of a corresponding tag. For example, the input feature may enable the user to indicate that the tag is accurate when in a first state and inaccurate when in a second state. Such feedback may be used to modify a probability associated with the corresponding tag. In this example, the probability may be modified to 100 percent if the user indicates that the tag is accurate or 0 percent if the user indicates that the tag is inaccurate. The feedback may also be used to train the computer visual analysis system, as described above.

In addition, crowd-sourcing may be implemented to further increase the accuracy of automatically generated tags. The results of crowd-sourcing may further improve automated system feature learning.

Through the disclosed embodiments, it is possible to increase the accuracy with which automated tagging is performed. This may be accomplished, at least in part, by improving the accuracy of the probabilities associated with a set of tags generated via computer vision analysis. As a result, a user may submit a search query to search for visual media items, even where users have not previously manually tagged those media items. Due to the greater accuracy with which automated tagging may be performed, the user's search query may be more robust. For example, a user may submit a query such as "find a photo I took three years ago when I was on the beach with my dog" or "show me all my photos with red cars."

It is important to note that the above-described embodiments are merely illustrative. For example, while many of the examples described herein increase the probabilities associated with tags, it is important to note that the probabilities may also be decreased. Furthermore, the additional information that is analyzed may result in the elimination of a tag associated with a visual media item, as well as the addition of a tag associated with a visual media item.

Network

A network may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, or any combination thereof. Likewise, sub-networks, such as may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a telephone line or link, for example.

Content Distribution Network

A distributed system may include a content distribution network. A "content delivery network" or "content distribution network" (CDN) generally refers to a distributed content delivery system that comprises a collection of computers or computing devices linked by a network or networks. A CDN may employ software, systems, protocols or techniques to facilitate various services, such as storage, caching, communication of content, or streaming media or applications. Services may also make use of ancillary technologies including, but not limited to, "cloud computing," distributed storage, DNS request handling, provisioning, signal monitoring and reporting, content targeting, personalization, or business intelligence. A CDN may also enable an entity to operate or manage another's site infrastructure, in whole or in part.

Peer-to-Peer Network

A peer-to-peer (or P2P) network may employ computing power or bandwidth of network participants in contrast with a network that may employ dedicated devices, such as dedicated servers, for example; however, some networks may employ both as well as other approaches. A P2P network may typically be used for coupling nodes via an ad hoc arrangement or configuration. A peer-to-peer network may employ some nodes capable of operating as both a "client" and a "server."

Wireless Network

A wireless network may couple client devices with a network. A wireless network may employ stand-alone ad-hoc networks, mesh networks, Wireless LAN (WLAN) networks, cellular networks, or the like.

A wireless network may further include a system of terminals, gateways, routers, or the like coupled by wireless radio links, or the like, which may move freely, randomly or organize themselves arbitrarily, such that network topology may change, at times even rapidly. A wireless network may further employ a plurality of network access technologies, including Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example.

For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

Internet Protocol

Signal packets communicated via a network, such as a network of participating digital communication networks, may be compatible with or compliant with one or more protocols. Signaling formats or protocols employed may include, for example, TCP/IP, UDP, DECnet, NetBEUI, IPX, Appletalk, or the like. Versions of the Internet Protocol (IP) may include IPv4 or IPv6.

The Internet refers to a decentralized global network of networks. The Internet includes LANs, WANs, wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc. that may route the signal packet in accordance with a target address and availability of a network path to the target address.

Network Architecture

Figure 8:
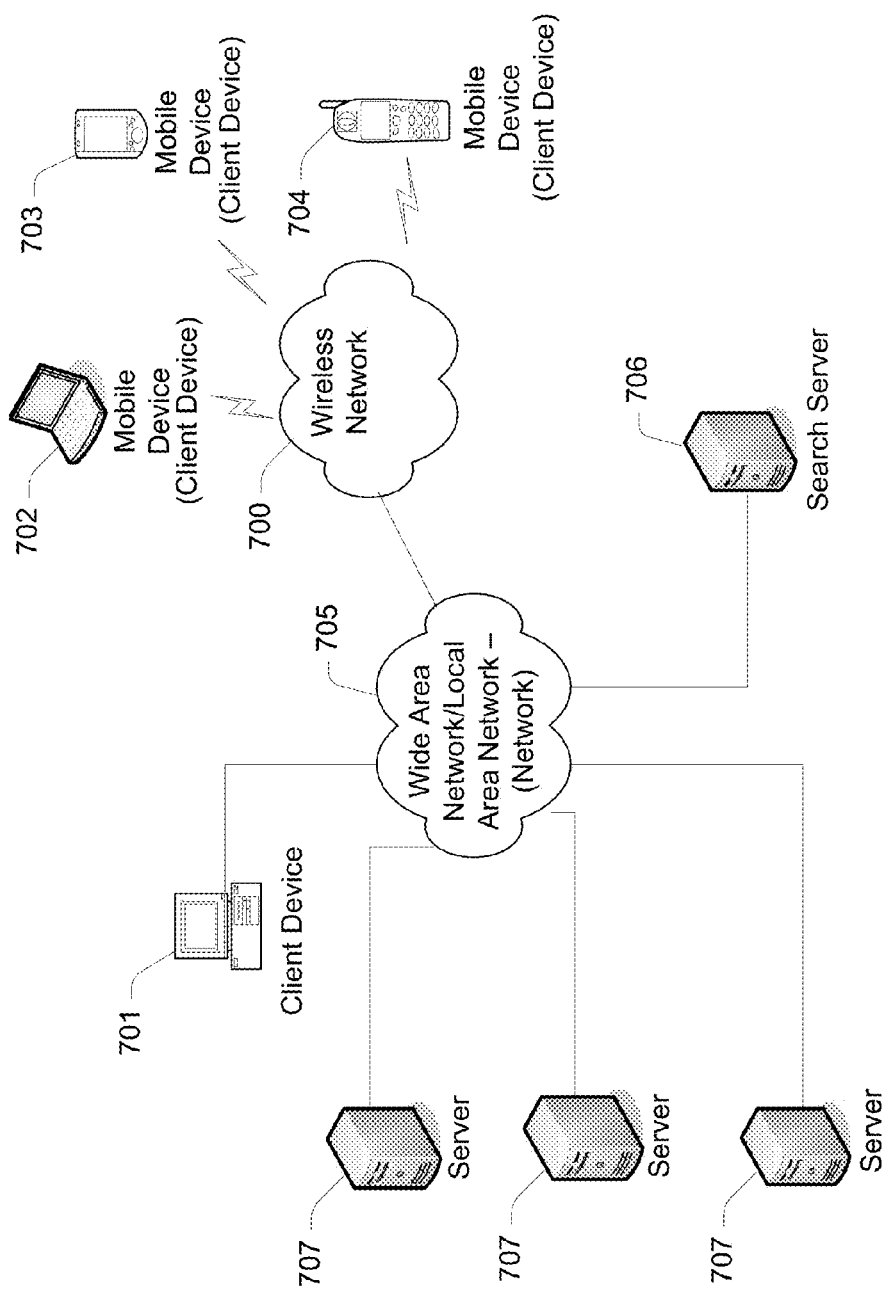
FIG. 8 is a schematic diagram illustrating an example embodiment of a network in which various embodiments may be implemented.

The disclosed embodiments may be implemented in any of a wide variety of computing contexts. FIG. 8 is a schematic diagram illustrating an example embodiment of a network. Other embodiments that may vary, for example, in terms of arrangement or in terms of type of components, are also intended to be included within claimed subject matter. Implementations are contemplated in which users interact with a diverse network environment. As shown, FIG. 8, for example, includes a variety of networks, such as a LAN/WAN 705 and wireless network 700, a variety of devices, such as client devices 701-704, and a variety of servers such as content server(s) 707 and search server 706. The servers may also include an ad server (not shown). As shown in this example, the client devices 701-704 may include one or more mobile devices 702, 703, 704. Client device(s) 701-704 may be implemented, for example, via any type of computer (e.g., desktop, laptop, tablet, etc.), media computing platforms (e.g., cable and satellite set top boxes), handheld computing devices (e.g., PDAs), cell phones, or any other type of computing or communication platform.

The disclosed embodiments may be implemented in some centralized manner. This is represented in FIG. 8 by server(s) 707, which may correspond to multiple distributed devices and data store(s). The server(s) 707 and/or corresponding data store(s) may store user account data, user information, and/or content.

Server

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

Content Server

A content server may comprise a device that includes a configuration to provide content via a network to another device. A content server may, for example, host a site, such as a social networking site, examples of which may include, without limitation, Flicker, Twitter, Facebook, LinkedIn, or a personal user site (such as a blog, vlog, online dating site, etc.). A content server may also host a variety of other sites, including, but not limited to business sites, educational sites, dictionary sites, encyclopedia sites, wikis, financial sites, government sites, etc.

A content server may further provide a variety of services that include, but are not limited to, web services, third-party services, audio services, video services, email services, instant messaging (IM) services, SMS services, MMS services, FTP services, voice over IP (VOIP) services, calendaring services, photo services, or the like. Examples of content may include text, images, audio, video, or the like, which may be processed in the form of physical signals, such as electrical signals, for example, or may be stored in memory, as physical states, for example.

Examples of devices that may operate as a content server include desktop computers, multiprocessor systems, microprocessor-type or programmable consumer electronics, etc.

Client Device

Figure 9:
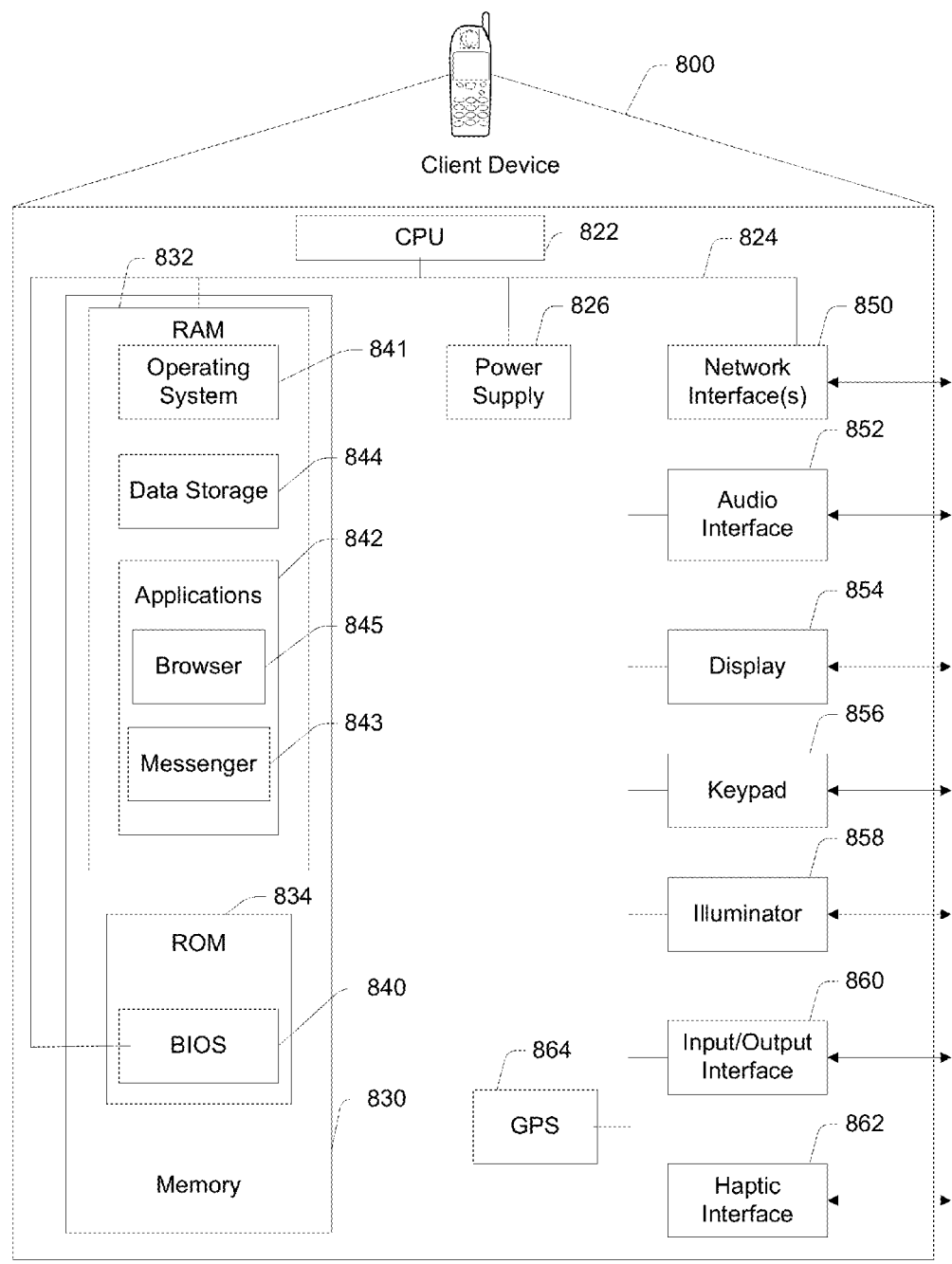
FIG. 9 is a schematic diagram illustrating an example client device in which various embodiments may be implemented.

FIG. 9 is a schematic diagram illustrating an example embodiment of a client device in which various embodiments may be implemented. A client device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device, a Personal Digital Assistant (PDA), a handheld computer, a tablet computer, a laptop computer, a set top box, a wearable computer, an integrated device combining various features, such as features of the forgoing devices, or the like. A portable device may also be referred to as a mobile device or handheld device.

As shown in this example, a client device 800 may include one or more central processing units (CPUs) 822, which may be coupled via connection 824 to a power supply 826 and a memory 830. The memory 830 may include random access memory (RAM) 832 and read only memory (ROM) 834. The ROM 834 may include a basic input/output system (BIOS) 840.

The RAM 832 may include an operating system 841. More particularly, a client device may include or may execute a variety of operating systems, including a personal computer operating system, such as a Windows, iOS or Linux, or a mobile operating system, such as iOS, Android, or Windows Mobile, or the like. The client device 800 may also include or may execute a variety of possible applications 842 (shown in RAM 832), such as a client software application such as messenger 843, enabling communication with other devices, such as communicating one or more messages, such as via email, short message service (SMS), or multimedia message service (MMS), including via a network, such as a social network, including, for example, Facebook, LinkedIn, Twitter, Flickr, or Google, to provide only a few possible examples. The client device 800 may also include or execute an application to communicate content, such as, for example, textual content, multimedia content, or the like, which may be stored in data storage 844. A client device may also include or execute an application such as a browser 845 to perform a variety of possible tasks, such as browsing, searching, playing various forms of content, including locally stored or streamed video, or games (such as fantasy sports leagues).

The client device 800 may send or receive signals via one or more interface(s). As shown in this example, the client device 800 may include one or more network interfaces 850. The client device 800 may include an audio interface 852. In addition, the client device 800 may include a display 854 and an illuminator 858. The client device 800 may further include an Input/Output interface 860, as well as a Haptic Interface 862 supporting tactile feedback technology.

The client device 800 may transmit and detect patterns, images, or signals such as infra-red signals via the interface(s). Such patterns, images, or signals may uniquely identify a particular object (e.g., individual or item). For example, the client device 800 may transmit an infra-red blink pattern identifying a particular object, as well as detect an infra-red blink pattern.

The client device 800 may vary in terms of capabilities or features. Claimed subject matter is intended to cover a wide range of potential variations. For example, a cell phone may include a keypad such 856 such as a numeric keypad or a display of limited functionality, such as a monochrome liquid crystal display (LCD) for displaying text. In contrast, however, as another example, a web-enabled client device may include one or more physical or virtual keyboards, mass storage, one or more accelerometers, one or more gyroscopes, global positioning system (GPS) 864 or other location identifying type capability, or a display with a high degree of functionality, such as a touch-sensitive color 2D or 3D display, for example. The foregoing is provided to illustrate that claimed subject matter is intended to include a wide range of possible features or capabilities.

According to various embodiments, input may be obtained using a wide variety of techniques. For example, input for downloading or launching an application may be obtained via a graphical user interface from a user's interaction with a local application such as a mobile application on a mobile device, web site or web-based application or service and may be accomplished using any of a variety of well-known mechanisms for obtaining information from a user. However, it should be understood that such methods of obtaining input from a user are merely examples and that input may be obtained in many other ways.

Figure 10:
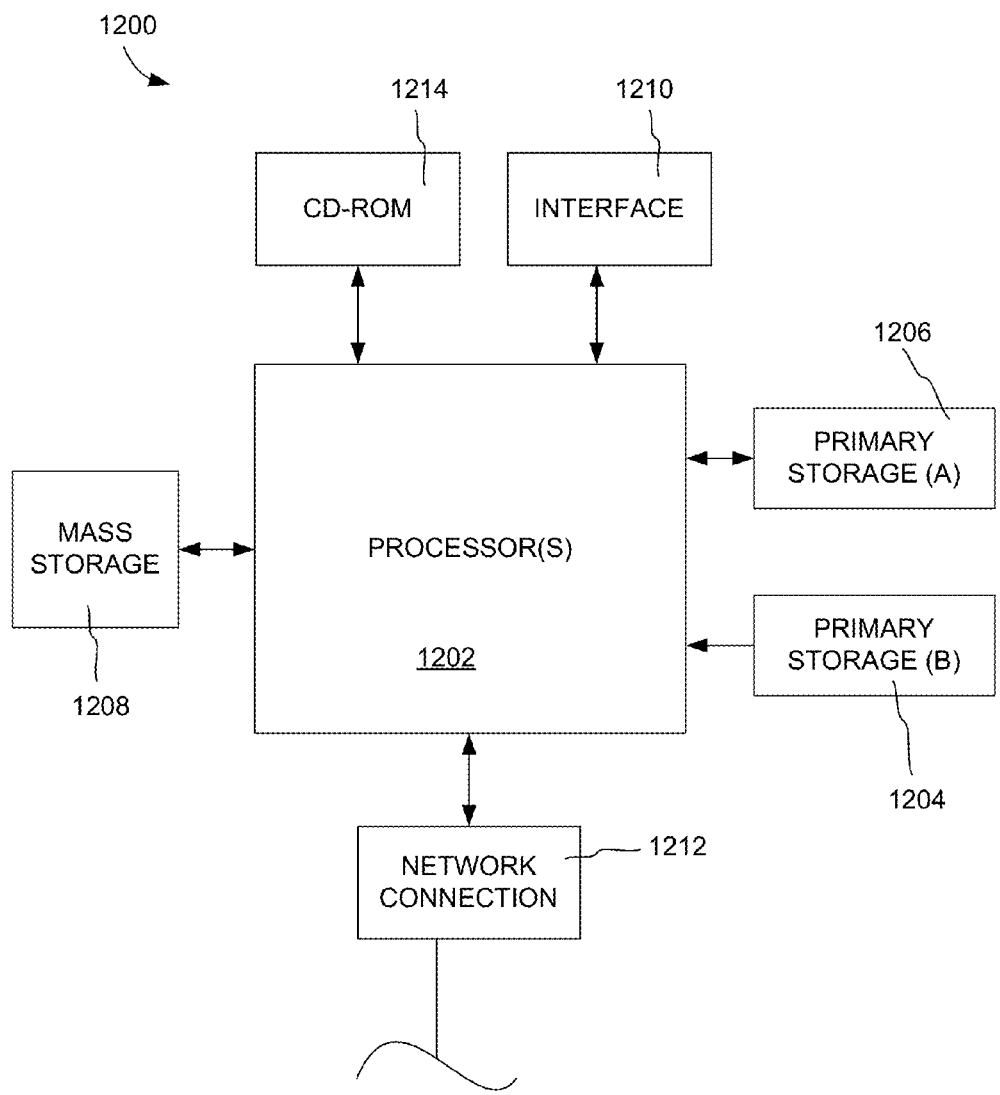
FIG. 10 is a schematic diagram illustrating an example computer system in which various embodiments may be implemented.

FIG. 10 illustrates a typical computer system that, when appropriately configured or designed, can serve as a system via which various embodiments may be implemented. The computer system 1200 includes any number of CPUs 1202 that are coupled to storage devices including primary storage 1206 (typically a RAM), primary storage 1204 (typically a ROM). CPU 1202 may be of various types including microcontrollers and microprocessors such as programmable devices (e.g., CPLDs and FPGAs) and unprogrammable devices such as gate array ASICs or general purpose microprocessors. As is well known in the art, primary storage 1204 acts to transfer data and instructions uni-directionally to the CPU and primary storage 1206 is used typically to transfer data and instructions in a bi-directional manner. Both of these primary storage devices may include any suitable computer-readable media such as those described above. A mass storage device 1208 is also coupled bi-directionally to CPU 1202 and provides additional data storage capacity and may include any of the computer-readable media described above. Mass storage device 1208 may be used to store programs, data and the like and is typically a secondary storage medium such as a hard disk. It will be appreciated that the information retained within the mass storage device 1208, may, in appropriate cases, be incorporated in standard fashion as part of primary storage 1206 as virtual memory. A specific mass storage device such as a CD-ROM 1214 may also pass data uni-directionally to the CPU.

CPU 1202 may also be coupled to an interface 1210 that connects to one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 1202 optionally may be coupled to an external device such as a database or a computer or telecommunications network using an external connection as shown generally at 1212. With such a connection, it is contemplated that the CPU might receive information from the network, or might output information to the network in the course of performing the method steps described herein.

Regardless of the system's configuration, it may employ one or more memories or memory modules configured to store data, program instructions for the general-purpose processing operations and/or the inventive techniques described herein. The program instructions may control the operation of an operating system and/or one or more applications, for example. The memory or memories may also be configured to store instructions for performing the disclosed methods, graphical user interfaces to be displayed in association with the disclosed methods, etc.

Because such information and program instructions may be employed to implement the systems/methods described herein, the disclosed embodiments relate to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as optical disks; and hardware devices that are specially configured to store and perform program instructions, such as ROM and RAM. Examples of program instructions include both machine code, such as produced by a compiler, and files containing higher level code that may be executed by the computer using an interpreter.

Computer program instructions with which various embodiments are implemented may be stored in any type of computer-readable media, and may be executed according to a variety of computing models including a client/server model, a peer-to-peer model, on a stand-alone computing device, or according to a distributed computing model in which various of the functionalities described herein may be effected or employed at different locations.

The disclosed techniques may be implemented in any suitable combination of software and/or hardware system, such as a web-based server or desktop computer system. Moreover, a system implementing various embodiments may be a portable device, such as a laptop or cell phone. An apparatus and/or web browser may be specially constructed for the required purposes, or it may be a general-purpose computer selectively activated or reconfigured by a computer program and/or data structure stored in the computer. The processes presented herein are not inherently related to any particular computer or other apparatus. In particular, various general-purpose machines may be used with programs written in accordance with the teachings herein, or it may be more convenient to construct a more specialized apparatus to perform the disclosed method steps.

Although the foregoing invention has been described in some detail for purposes of clarity of understanding, it will be apparent that certain changes and modifications may be practiced within the scope of the appended claims. Therefore, the present embodiments are to be considered as illustrative and not restrictive and the invention is not to be limited to the details given herein, but may be modified within the scope and equivalents of the appended claims.

What is claimed is:

1. A method, comprising:
ascertaining, from a database, a set of tags that has been generated by performing computer vision analysis of image content of a visual media item, each tag of the set of tags having a corresponding probability, wherein the probability indicates a likelihood that the tag accurately describes the image content of the visual media item;
obtaining, by a processor, a set of information that is independent from the image content of the visual media item, wherein obtaining the set of information includes performing a look up in a calendar to obtain at least a portion of the set of information using at least one of a date or time at which the visual media item was captured via a mobile device, wherein the portion of the set of information identifies an event that occurred on at least one of the date or time at which the visual media item was captured via the mobile device; and
modifying in the database the probability of at least a portion of the set of tags based, at least in part, upon the set of information, wherein modifying the probability of at least a portion of the set of tags includes increasing or decreasing the probability of a tag in the set of tags based, at least in part, upon whether the event corresponds to the tag.

2. The method as recited in claim 1, further comprising:
capturing the visual media item by a mobile device;
detecting, via one or more sensors of the mobile device, an identity of an object or individual in a vicinity of the mobile device;
wherein the set of information includes an indication of the identity of the object or individual in the vicinity of the mobile device at the time that the mobile device captured the visual media item.

3. The method as recited in claim 1, wherein the set of information comprises an indication of an identity of an object or individual in a vicinity of a mobile device, wherein the identity of the object or individual is detected by the mobile device at the time that the mobile device captured the visual media item.

4. The method as recited in claim 1, further comprising:
performing similarity analysis with respect to the visual media item and other visual media items to identify a set of visual media items that are similar to the visual media item;
wherein obtaining a set of information that is independent from the image content of the visual media item includes ascertaining a set of tags associated with each similar visual media item in the set of media items, each tag of the set of tags associated with each similar visual media item having a corresponding probability.

5. The method as recited in claim 1, further comprising:
ascertaining a date or time at which the visual media item was captured;
wherein the at least a portion of the set of information comprises a set of tags associated with at least one other visual media item captured within a threshold period of time from the date or time at which the visual media item was captured.

6. The method as recited in claim 1, wherein the set of information comprises a comment that has been posted with respect to the visual media item.

7. A system, comprising:
one or more processors; and
one or more memories, at least one of processors or the memories being adapted for:
ascertaining, from a database, a set of tags that has been generated by performing computer vision analysis of image content of a visual media item, each tag of the set of tags having a corresponding probability, wherein the probability indicates a likelihood that the tag accurately describes the image content of the visual media item;
obtaining a set of information that is independent from the image content of the visual media item, wherein obtaining the set of information includes performing a look up in a calendar to obtain at least a portion of the set of information using at least one of a date or time at which the visual media item was captured via a mobile device, wherein the portion of the set of information identifies an event that occurred on at least one of the date or time at which the visual media item was captured via the mobile device; and
modifying in the database, the probability of at least a portion of the set of tags based, at least in part, upon the set of information, wherein modifying the probability of at least a portion of the set of tags includes increasing or decreasing the probability of a tag in the set of tags based, at least in part, upon whether the event corresponds to the tag.

8. The system as recited in claim 7, wherein the set of information comprises:
an indication of an identity of an object or individual in a vicinity of a mobile device at a time that the mobile device captured the visual media item.

9. The system as recited in claim 8, wherein the system is the mobile device.

10. The system as recited in claim 7, at least one of the processors or the memories being configured for performing operations, further comprising:

performing similarity analysis with respect to the visual media item and other visual media items to identify a set of visual media items that are similar to the visual media item;

wherein obtaining a set of information that is independent from the image content of the visual media item includes ascertaining a set of tags associated with each similar visual media item in the set of media items, each tag of the set of tags associated with each similar visual media item having a corresponding probability.

11. The system as recited in claim 7, wherein the set of information comprises a comment that has been posted with respect to the visual media item.

12. A non-transitory computer-readable storage medium storing thereon computer-readable instructions for performing operations, comprising:

ascertaining, from a database a set of tags that has been generated by performing computer vision analysis of image content of a visual media item, each tag of the set of tags having a corresponding probability, wherein the probability indicates a likelihood that the tag accurately describes the image content of the visual media item;

obtaining a set of information that is independent from the image content of the visual media item, wherein obtaining the set of information includes performing a look up in a calendar to obtain at least a portion of the set of information using at least one of a date or time at which the visual media item was captured via a mobile device, wherein the portion of the set of information identifies an event that occurred on at least one of the date or time at which the visual media item was captured via the mobile device; and modifying, in the database, the probability of at least a portion of the set of tags based, at least in part, upon the set of information, wherein modifying the probability of at least a portion of the set of tags includes increasing or decreasing the probability of a tag in the set of tags based, at least in part, upon whether the event corresponds to the tag.

13. The non-transitory computer-readable storage medium as recited in claim 12, further comprising:

detecting, via one or more sensors of a mobile device, an identity of an object or individual in a vicinity of the mobile device;

wherein the set of information includes an indication of the identity of the object or individual in the vicinity of the mobile device at a time that the mobile device captured the visual media item.

14. The non-transitory computer-readable storage medium as recited in claim 12, wherein the set of information comprises an indication of an object or individual in a vicinity of a mobile device at the time that the mobile device captured the visual media item.

15. The non-transitory computer-readable storage medium as recited in claim 12, further comprising:

performing similarity analysis with respect to the visual media item and other visual media items to identify a set of visual media items that are similar to the visual media item;

wherein obtaining a set of information that is independent from the image content of the visual media item includes ascertaining a set of tags associated with each similar visual media item in the set of media items, each tag of the set of tags associated with each similar visual media item having a corresponding probability.

16. The non-transitory computer-readable storage medium as recited in claim 12, wherein the set of information comprises a comment that has been posted with respect to the visual media item.

17. The method as recited in claim 1, further comprising:

receiving a search query;

identifying a plurality of visual media items that are relevant to the search query based, at least in part, upon probabilities associated with tags of the plurality of visual media items; and providing the plurality of visual media items for display via a mobile device;

wherein the plurality of visual media items include the visual media item.

18. The method as recited in claim 1, further comprising:

identifying a plurality of visual media items stored on a mobile device;

organizing, by a processor of the mobile device, the plurality of visual media items in a plurality of folders based, at least in part, on tags associated with the plurality of visual media items and corresponding probabilities;

wherein the plurality of visual media items include the visual media item.

19. The method as recited in claim 1, wherein the calendar is associated with a particular user or is publicly available.

20. The method as recited in claim 3, wherein obtaining the set of information comprises detecting the identity of the object or individual via one or more sensors of a mobile device via which the visual media item was captured, wherein the sensors include a Radio Frequency Identifier (RFID) sensor or an Infra-red (IR) sensor.

21. The method as recited in claim 18, further comprising:

receiving a selection, via the mobile device, of one of the plurality of folders.

22. The method as recited in claim 1, wherein the visual media item is a photograph.

23. The method as recited in claim 1, further comprising:

capturing the visual media item by a mobile device;

detecting, via one or more sensors of the mobile device, an identity of an object in a vicinity of the mobile device;

wherein the set of information includes an indication of the identity of the object in the vicinity of the mobile device at the time that the mobile device captured the visual media item.

* * * * *